United States Patent

[11] 3,626,416

[72] Inventor Gerald Rabow
  Nutley, N.J.
[21] Appl. No. 32,952
[22] Filed Apr. 29, 1970
[45] Patented Dec. 7, 1971
[73] Assignee International Telephone and Telegraph Corporation
  Nutley, N.J.

[54] DIRECTION FINDING RECEIVER
  10 Claims, 1 Drawing Fig.
[52] U.S. Cl. .................................................. 343/113 R,
  325/361, 343/113 PT
[51] Int. Cl. ..................................................... G01s 3/48
[50] Field of Search ............................................ 343/113,
  113 PT; 325/361, 307

[56] References Cited
  UNITED STATES PATENTS
  1,510,792  10/1924  Merritt ......................... 343/113

2,416,155  2/1947  Chubb ........................... 343/113 X

OTHER REFERENCES
  Electronics, October, 1955, page 10. TK 7800. E58

Primary Examiner—Richard A. Farley
Assistant Examiner—Richard E. Berger
Attorneys—C. Cornell Remsen, Jr., Walter J. Baum, Paul W. Hemminger, Charles L. Johnson, Jr., Philip M. Bolton, Edward Goldberg and Menotti J. Lombardi, Jr.

ABSTRACT: An antenna having an omnidirectional or a predetermined directional pattern and an earphone are disposed adjacent each of the ears of a human. The antennas are interconnected by a binaural receiver to convert the radio frequency signal received by both the antennas into a pair of audiofrequency signals and preserve in the pair of audiofrequency signals the phase relationship between the received radio frequency signals. This will enable the human's sense of direction, as provided by the characteristics of the human ears, to locate the direction of the radiofrequency signal.

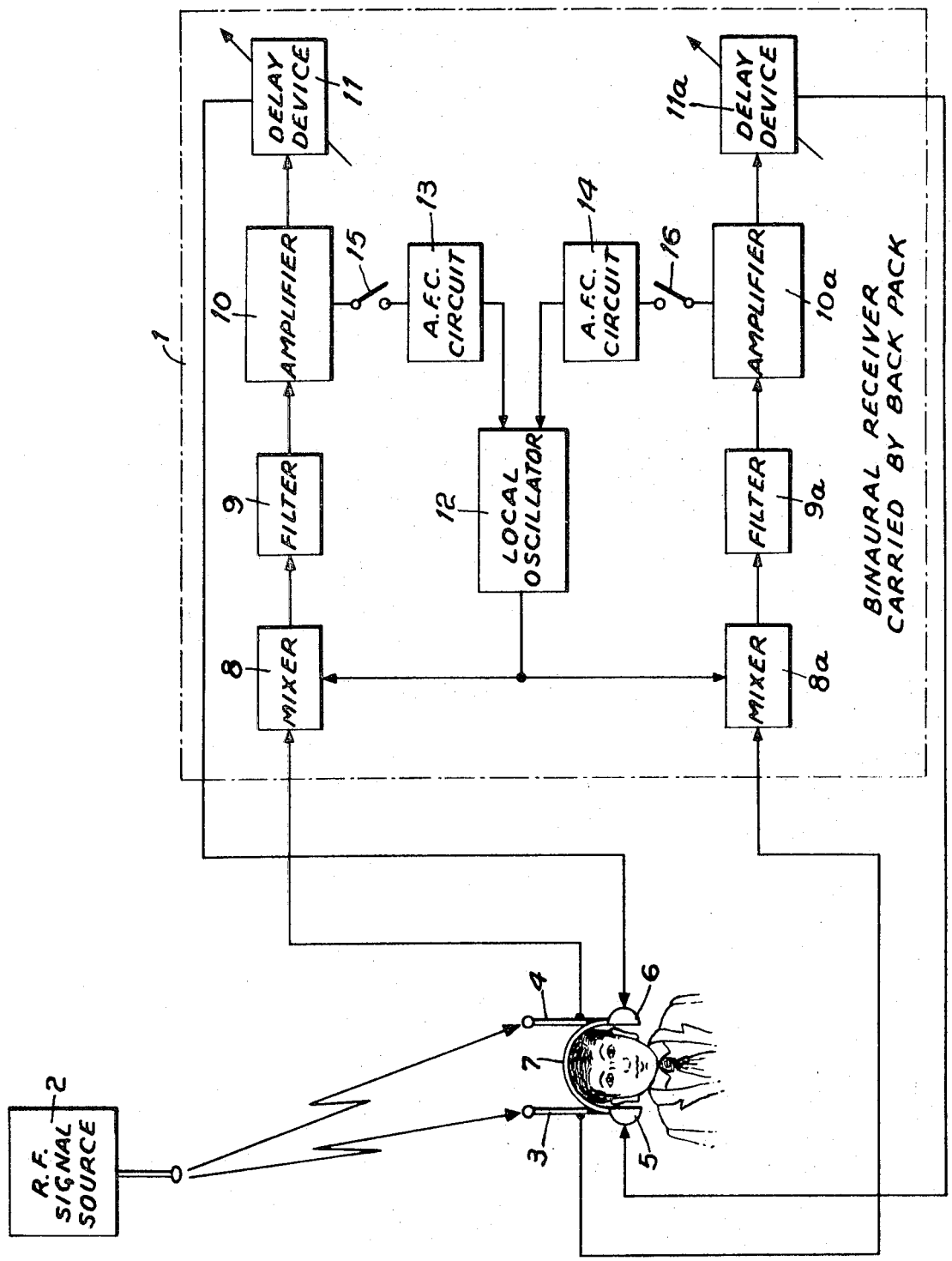

DIRECTION FINDING RECEIVER

BACKGROUND OF THE INVENTION

This invention relates to a direction-finding system and more particularly to a direction-finding receiver capable of being carried by personnel having the requirement of locating the direction of a source of radio frequency signal, such as a distress signal or an alarm signal.

It is known in the prior art that a transmitter for radio frequency energy can be employed by a law enforcement officer or the like to indicate the need of assistance and that a receiver carried by a fellow law enforcement officer can be utilized to direction find on the source and at the same time receive information as to the emergency condition. It is also known that radio frequency sources can be utilized as burglar alarm systems and that a law enforcement officer can have on his person a receiver capable of direction finding on the radio frequency burglar alarm source. There is also known that such a radio frequency source and portable direction-finding receiver can be employed to enable the location of a downed aircraft in a densely wooded area or rugged terrain, or to locate a person that has parachuted to the surface in a rugged terrain. In both these situations a radio frequency source is placed into operation at the site of the downed aircraft or parachutist and a search party would include among its members one person with a direction-finding receiver to direction find upon the source. This will enable a more immediate rescue of or assistance to passengers in the downed aircraft or the downed parachutist.

The prior art radio receivers employed for direction-finding purposes have employed as an integral component therewith a directional antenna that is the component enabling direction finding upon the transmitted radio frequency source.

SUMMARY OF THE INVENTION

An object of the present invention is to provide still another form of direction finding receiver which may operate in any of the above conditions mentioned under the heading "-Background of the Invention."

Another object of the present invention is to provide a direction-finding receiver relying upon the binaural capabilities of a human.

A feature of this invention is the provision of a portable direction-finding receiver utilizing the ears of a human and the human's resultant sense of direction to locate the direction of a radio frequency signal source comprising a pair of antennas having a predetermined pattern and disposed adjacent a different one of the ears of a human in communication with the source; a binaural receiver coupled to the pair of antennas to convert the radio frequency signals received by each of the antennas to a pair of audiofrequency signals and preserve in the audiofrequency signals the phase relationship between the received radio frequency signals and a pair of earphones each disposed in a listening relationship with a different one of the ears of the human coupled to the receiver to enable the human to respond to the pair of audiofrequency signals and locate the direction of the source.

BRIEF DESCRIPTION OF THE DRAWING

The above-mentioned and other features and objects of this invention will become apparent by reference to the following description taken in conjunction with the accompanying drawings, in which the sole FIGURE illustrates a binaural receiver in connection with a radio frequency source in accordance with the principles of the present invention.

DESCRIPTION OF THE PREFERRED EMBODIMENTS

The binaural receiver which may be carried by back pack as indicated at 1 in the FIGURE operates in conjunction with a human who uses his capabilities of binaural direction finding in conjunction with a radio frequency (RF) signal source 2 which may be carried by a fellow law enforcement officer, may be arranged as a burglar alarm at a premise within the control range, may be used in a downed aircraft, or by downed parachutists of a disabled aircraft or the like. RF source 2 is so arranged that when the source is activated the signal transmitted in the radio frequency range cannot be easily disturbed for a preassigned time period and could be disguised so as to not be obviously a transmitter. Such disguise may take the form of everyday objects, such as pens, cigarette lighters, handbag accessories, etc. Where employed in buildings or vehicles, the transmitter might be provided with propagating or relay device to relay the radio frequency alarm to the outside of the enclosure so that an unobstructed range to the receiver carried by a law enforcement officer, or search party member would be present. Source 2 could also be arranged to provide a coded transmission so as to indicate the type of emergency and/or the particular person carrying the transmitter.

The receiver in accordance with the principles of this invention to be carried by an individual is both simple and small. The concept for the receiver of the present invention is to make the source of the alarm provided by source 2 appear like an audio police whistle to the law enforcement officer, or a party of a rescue or search team. By doing this, this allows the human's audio sense of direction to guide the personnel carrying the receiver of this invention to source 2.

The receiver of this invention includes a pair of antennas 3 and 4 mounted adjacent the ears of the individual carrying the receiver who also has disposed adjacent his ears a pair of earphones 5 and 6. As illustrated, for example only, earphones 5 and 6 are carried by a headset including the supporting band 7 upon which the antennas 3 and 4 are supported in a nonconducting relation with earphones 5 and 6. The antennas 3 and 4 are so spaced with respect to each other that there is a phase difference between the RF signal received from source 2 by antenna 3 with respect to the RF signal received from source 2 by antenna 4. The output of these two antennas are then coupled to the remainder of binaural receiver 1 carried in a back pack by the individual desiring to locate the direction of source 2. Each of the antennas 3 and 4 are coupled to a signal channel each of which includes mixer 8, filter 9, amplifier 10 and variable delay device 11. Common to the two signal channels and coupled to mixers 8 and 8a is a local oscillator 12 which has a frequency below that of the RF signal frequency so that the phase relationship between the RF signal received by antennas 3 and 4 is maintained in the two audio signals passed through their associated signal channels of binaural receiver 1. The value of the frequency of the output signal of oscillator 12 is selected with respect to the value of the frequency of the RF signal from source 2 so as to provide a convenient audio frequency in both of the channels. The filters 9 in each of the signal channels operates to assure that only the audiofrequency signal selected is passed which is then amplified in amplifiers 10 prior to application to the earphones 5 and 6. The purpose of delay devices of 11 and 11a is to ensure that the circuit delay due to the components in both the signal channels are balanced one with respect to the other so that the phase relationship present in mixers 8 and 8a, which is the same phase relationship of the RF signals received at antennas 3 and 4, is maintained.

The receiver of this invention works because (1) phase is preserved through mixers 8 and 8a, that is, the phase of the received RF signals at antennas 3 and 4 and (2) frequencies are chosen so that the audio wavelength in air is equal to the radio frequency wavelength in air. The ratio of the radio frequency to audiofrequency under these conditions is in the order of $10^6$. These conditions taken together with the properly balanced delays in the two signal channels of binaural receiver 1 provide for sounds appearing at the ears much the same as they would have been for an audio whistle and the phase difference at the human ears will enable the listener to determine the direction of source 2.

In the foregoing description, the antennas 3 and 4 are considered to have an omnidirectional pattern. However, it has been discovered that the direction finding by the human ear is also effected by intensity of the sound although to a lesser extent than by phase. Hence, the direction finding receiver of the present invention can be improved by also making the patterns of antennas 3 and 4 directional such that the directional patterns of antennas 3 and 4 approximate the directional patterns of the associated ears.

The accuracy of the direction finding also can be improved by using multiple frequency RF signals from source 2 and, thus, simulating a more complex whistle than a pure tone. Alternatively, a single radio frequency could be transmitted from source 2, but antenna pairs are multiplied and each pair will have a different spacing with the local oscillator frequencies for each pair of antennas being provided to simulate a multitone whistle.

Local oscillator 12 is assumed, as described above, to be a very stable oscillator, such as provided by a crystal controlled oscillator. However, if the stability of oscillator 12 cannot be properly maintained, it is proposed that one of the standard frequency automatic frequency control circuits can be employed to control the local oscillator 12 as indicated by automatic frequency control circuits 13 and 14 being incorporated into the circuit of receiver 1 when switches 15 and 16 are closed.

While I have described above the principles of my invention in connection with specific apparatus, it is to be clearly understood that this description is made only by way of example and not as a limitation to the scope of my invention as set forth in the objects thereof and in the accompanying claims.

I claim:

1. A portable direction finding receiver utilizing the ears of a human and the human's resultant sense of direction to locate the direction of a radio frequency signal source comprising:
    a pair of antennas each having a predetermined pattern and disposed adjacent a different one of said ears of said human in communication with said source;
    a binaural receiver coupled to said pair of antennas to convert said radio frequency signals received by each of said antennas to a pair of audiofrequency signals and preserve in said audiofrequency signals the phase relationship between said received radio frequency signals; and
    a pair of earphones each disposed in a listening relationship with a different one of said ears of said human coupled to said receiver to enable said human to respond to said pair of audiofrequency signals and locate the direction of said source.

2. A direction-finding receiver according to claim 1, wherein
    the audio wavelength in air of said pair of audiofrequency signals is equal to the radio frequency wavelength in air of said radio frequency signal.

3. A direction-finding receiver according to claim 1, wherein each of said pair of antennas has an omnidirectional pattern.

4. A direction-finding receiver according to claim 1, wherein
    each of said pair of antennas has a directional pattern approximating the directional pattern of the associated one of said ears.

5. A direction-finding receiver according to claim 1, wherein
    said binaural receiver includes
        a first signal channel including
            a first mixer means coupled to one of said pair of antennas,
        a second signal channel including
            a second mixer means coupled to the other of said pair of antennas, and
        oscillator means coupled to both said first and second mixer means to provide one of said pair of audiofrequency signals in said first signal channel and the other of said pair of audiofrequency signals in said second signal channel.

6. A direction-finding receiver according to claim 5, wherein
    the frequency of the output signal of said oscillator means has a value below the value of the frequency of said radio frequency signal.

7. A direction-finding receiver according to claim 6, wherein
    the value of the frequency of the output signal of said oscillator means is selected relative to the value of frequency of said radio frequency signal to provide a value of frequency for said pair of audiofrequency signals so that the audio wavelength in air of said pair of audiofrequency signals is equal to the radiofrequency wavelength in air of said radio frequency signal.

8. A direction-finding receiver according to claim 5, wherein
    said binaural receiver further includes
        an automatic frequency control means to stabilize the value of the frequency of the output signal of said oscillator means.

9. A direction-finding receiver according to claim 8, wherein
    the value of the stabilized frequency of the output signal of said oscillator means is selected relative to the value of frequency of said radio frequency signal to provide a value of frequency for said pair of audiofrequency signals so that the audio wavelength in air of said pair of audiofrequency signals is equal to the
    radio frequency wavelength in air of said radio frequency signal.

10. A direction-finding receiver according to claim 5, wherein
    at least one of said first and second signal channels includes
        a variable delay means to equalize the inherent circuit delays in each of said first and second signal channels.

* * * * *